United States Patent
Kramer et al.

(10) Patent No.: US 9,523,377 B2
(45) Date of Patent: Dec. 20, 2016

(54) METHOD FOR CONTROLLING AN ACTUATOR

(75) Inventors: Rupert Kramer, Friedrichshafen (DE); Peter Herter, Ravensburg (DE); Franz Bitzer, Friedrichshafen (DE); Roland Mair, Tettnang (DE); Florian Schneider, Lindenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 574 days.

(21) Appl. No.: 13/993,871

(22) PCT Filed: Nov. 8, 2011

(86) PCT No.: PCT/EP2011/069597
§ 371 (c)(1),
(2), (4) Date: Jun. 13, 2013

(87) PCT Pub. No.: WO2012/084332
PCT Pub. Date: Jun. 28, 2012

(65) Prior Publication Data
US 2013/0298757 A1    Nov. 14, 2013

(30) Foreign Application Priority Data

Dec. 20, 2010  (DE) .................. 10 2010 063 513

(51) Int. Cl.
| | |
|---|---|
| F15B 11/00 | (2006.01) |
| F15B 15/20 | (2006.01) |
| F16D 48/02 | (2006.01) |

(52) U.S. Cl.
CPC .............. *F15B 15/20* (2013.01); *F16D 48/02* (2013.01); *F16D 2048/0233* (2013.01);
(Continued)

(58) Field of Classification Search
CPC .......... F15B 15/202; F15B 15/20; F16D 48/02; F16D 2500/3024; F16D 2048/0278; F16D 2500/70235; F16D 2500/70605; F16D 2500/70211; F16D 2500/3023; F16D 2500/10412; F16D 2048/0233; F16D 2500/3026
(Continued)

(56) References Cited

U.S. PATENT DOCUMENTS

| | | | | |
|---|---|---|---|---|
| 5,056,561 | A | * | 10/1991 | Byers ...................... F15B 11/05 137/596.13 |
| 8,056,332 | B2 | | 11/2011 | Doebele et al. |
| 2009/0247357 | A1 | * | 10/2009 | Doebele .............. F15B 11/0406 477/78 |

FOREIGN PATENT DOCUMENTS

| | | |
|---|---|---|
| DE | 10 2004 035 262 A1 | 2/2006 |
| DE | 10 2006 021 698 A1 | 11/2007 |

(Continued)

OTHER PUBLICATIONS

"Valve Response Time", Control Valve Handbook, ISA & Crane Company.*
(Continued)

*Primary Examiner* — Michael Leslie
*Assistant Examiner* — Dustin T Nguyen
(74) *Attorney, Agent, or Firm* — Davis & Bujold PLLC; Michael J. Bujold

(57) ABSTRACT

A method of controlling a pneumatic actuator for actuation of a pneumatically actuated device. The actuator comprises a piston and a pneumatic cylinder, the piston is arranged to move axially within the pneumatic cylinder. The piston is moved as a function of a pressure in a pressure chamber of the pneumatic cylinder, and the pressure in the pressure chamber is adjusted by a control unit which controls at least a valve and/or a pressure regulator and/or a pressure gen-
(Continued)

erating device. A pilot control component, for the control, is determined as a function of at least a sliding friction force and/or at least a static friction force of the pneumatic actuator.

4 Claims, 2 Drawing Sheets

(52) U.S. Cl.
  CPC ........... *F16D 2048/0278* (2013.01); *F16D 2500/10412* (2013.01); *F16D 2500/3023* (2013.01); *F16D 2500/3024* (2013.01); *F16D 2500/3026* (2013.01); *F16D 2500/70211* (2013.01); *F16D 2500/70235* (2013.01); *F16D 2500/70605* (2013.01)

(58) Field of Classification Search
  USPC .................................... 60/462, 463; 91/403
  See application file for complete search history.

(56) References Cited

FOREIGN PATENT DOCUMENTS

| DE | 10 2006 030 142 A1 | 1/2008 |
|---|---|---|
| EP | 0 298 245 A2 | 1/1989 |
| EP | 2 016 302 B1 | 2/2010 |
| WO | 2008/000598 A1 | 1/2008 |

OTHER PUBLICATIONS

German Search Report Corresponding to 10 2010 063 513.8 mailed Jun. 6, 2011.
International Search Report Corresponding to PCT/EP2011/069597 mailed Jun. 4, 2012.
Written Opinion Corresponding to PCT/EP2011/069597 mailed Jun. 4, 2012.

* cited by examiner

METHOD FOR CONTROLLING AN ACTUATOR

This application is a National Stage completion of PCT/EP2011/069597 filed Nov. 8, 2011, which claims priority from German patent application Ser. No. 10 2010 063 513.8 filed Dec. 20, 2010.

FIELD OF THE INVENTION

The invention concerns a method for controlling a pneumatic actuator.

BACKGROUND OF THE INVENTION

From EP 2 016 302 B1 a method is known for controlling a pneumatic actuator for the actuation of a pneumatically actuated device, such as a pneumatically actuated starting clutch of a motor vehicle. According to this prior art, the pneumatic actuator comprises a piston arranged to move axially in a pneumatic cylinder, the piston being displaced as a function of a pneumatic pressure in a pressure chamber of the pneumatic cylinder. The pressure in a pressure chamber of the pneumatic cylinder can be adjusted by means of a control valve, itself being actuated by a control device. To increase the pressure in the pressure chamber, the control valve adopts a first position, in which first position compressed air can be passed by way of the control valve into the pressure chamber in order to increase the pressure in the pressure chamber of the cylinder. In contrast, in a second position of the control valve, compressed air can pass out of the pressure chamber toward a pressure medium sink in order to lower the pressure in the pressure chamber.

According to EP 2 016 302 B1 the pneumatic actuator is controlled in such a manner that an intended piston movement direction is preceded by a movement direction opposite to the intended movement direction. In that way, an external force acting on the actuator is increased, whereby possible stick-slip effects can be overcome.

The use of pneumatic actuators for controlling a starting clutch or for controlling clutches or brakes of an automated change-speed transmission imposes strict demands on the dynamics and the control precision.

Until now it has been difficult to fulfill these strict demands without restriction on the dynamics and control precision of pneumatic actuators. Rather, the dynamics of pneumatic actuators have until now been restricted by dead times.

Accordingly, a method is needed for the control of a pneumatic actuator, with which dead times can be reduced.

SUMMARY OF THE INVENTION

Starting from there, the purpose of the present invention is to provide a method for controlling an actuator, by means of which dead times can be reduced.

This objective is achieved by a method, according to the invention, in which a pilot control component, e.g., a part of the force applied by the control, depends on at least a sliding friction force and/or at least a static friction force of the pneumatic actuator.

The present invention proposes to determine a pilot control component for the control of the pneumatic actuator as a function of at least a sliding friction force and/or at least a static friction force. Accordingly, with regard to the invention the friction forces to be overcome when moving the piston of the actuator are taken into account by the pilot control component, whereby dead times can be reduced or even completely eliminated. In that way the dynamics of a pneumatic actuator for actuating a pneumatically actuated device can be improved.

Furthermore, by virtue of the pilot control component, the control precision can be increased.

According to an advantageous further development of the invention, when the piston of the actuator is to be set into motion from rest in a defined movement direction which is the same as its previous movement direction, the pilot control component is chosen such that it is suitable just, or exclusively, or exactly to overcome the variation or difference between the sliding friction force acting in the defined movement direction and the static friction force acting in the defined movement direction, or such that it corresponds to the variation or difference.

In another advantageous further development of the invention, when the piston of the actuator is to be set into motion from rest in a defined movement direction, which is the reverse of its previous movement direction, the pilot control component is chosen such that it is suitable just, or exclusively, or exactly to overcome the variation or difference between the sliding friction force acting in the defined movement direction and the static friction force acting in the defined movement direction and the variation or difference between the sliding friction force acting in the defined movement direction and the sliding friction force acting in the direction opposite to the defined movement direction, or such that it corresponds to the variations or differences.

In another advantageous further development of the invention, when the piston is at rest and its next movement direction is not known, the pilot control component for the control is chosen such that it corresponds to half the variation or half the difference between the static friction forces acting in opposite movement directions.

Preferably, the sliding friction force of the piston and its static friction force in the defined movement direction and its sliding friction force and static friction force acting in the opposite movement direction in each case depend on the position of the piston.

BRIEF DESCRIPTION OF THE DRAWINGS

Preferred further developments of the invention emerge from the following description. Example embodiments of the invention, to which it is not limited, are explained in more detail with reference to the drawings, which show.

DETAILED DESCRIPTION OF THE PREFERRED EMBODIMENTS

The invention concerns a method for controlling a pneumatic actuator serving to actuate a pneumatically actuated device such as a starting clutch of a motor vehicle or a shifting element of an automated change-speed transmission.

Figure 1:
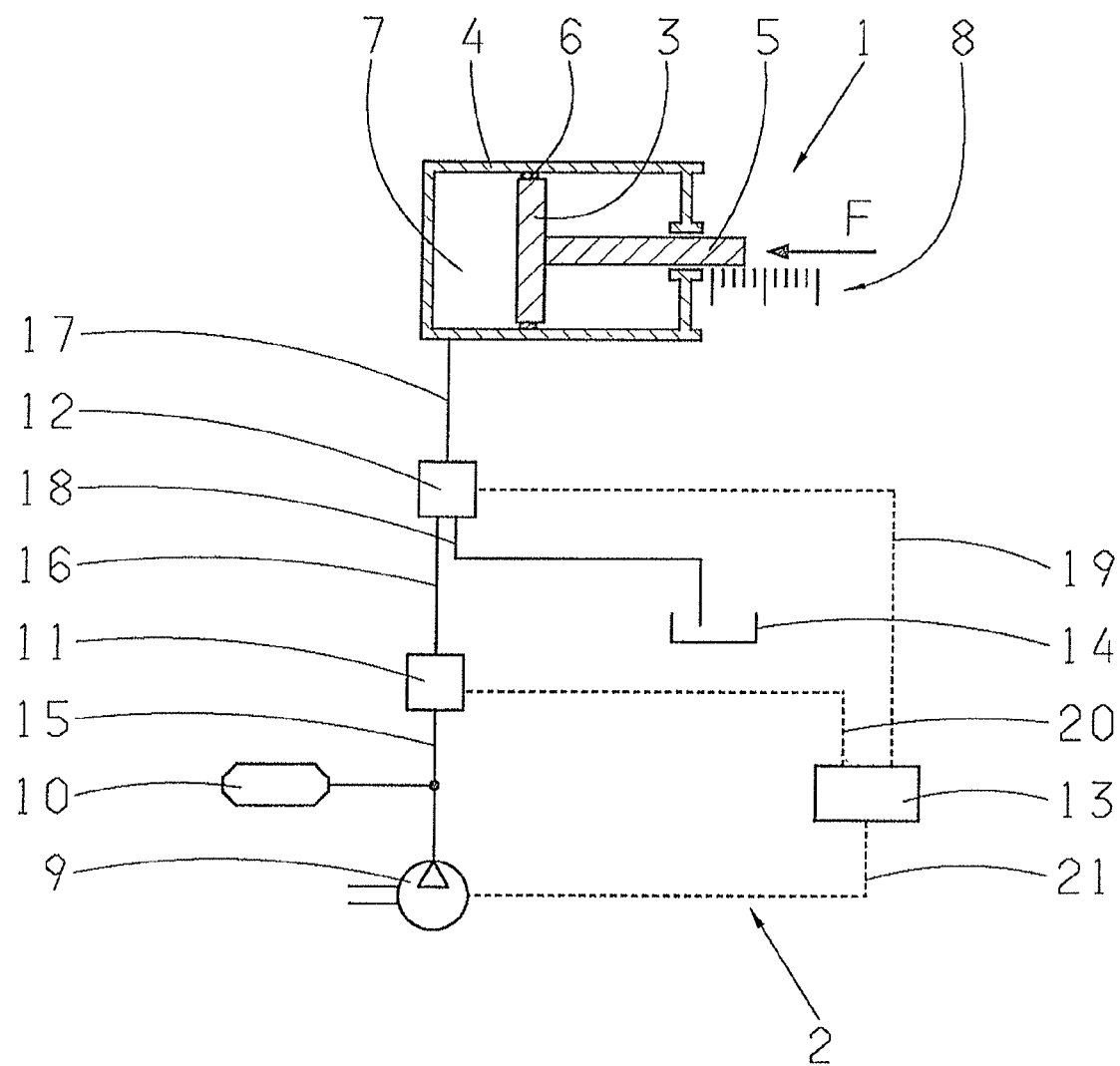
FIG. 1: A schematic representation of a pneumatic actuator.

FIG. 1 shows an example embodiment of a pneumatic actuator 1, which as shown in FIG. 1 is in the form of a piston-cylinder arrangement. The actuator 1 is controlled by means of a pressure regulation device 2.

The actuator 1 comprises a piston 3 arranged to move axially in a pneumatic cylinder 4, a piston rod 5 being coupled to the piston 3. Between the piston 3 and the pneumatic cylinder 4, a seal 6 can be positioned. When the actuator 1 is actuated, then in the example embodiment of FIG. 1 an external force F acts upon the piston rod 5.

As already explained, the pneumatic actuator 1 is controlled by the pressure regulation device 2 in such manner that by means of the pressure regulation device 2 a pressure in a pressure chamber 7 of the actuator 1 can be adjusted. If in FIG. 1 the piston 3 is to be moved to the right, the pressure in the pressure chamber 7 has to be increased. On the other hand if in FIG. 1 the piston 3 is to be moved to the left, then the pressure in the pressure chamber 7 has to be reduced. The movement of the piston 3 can be recorded for example by a path measurement system 8, e.g., by way of a path sensor arranged internally or externally on the actuator 1.

In the example embodiment of FIG. 1, the pressure regulation device 2 comprises a pressure generating device 9, for example a pump, which brings the compressed air of the pneumatic actuator to a so-termed main pressure. This main pressure is produced in a main pressure line 15 connected to a pressure medium reservoir 10. In the pressure medium reservoir 10 a comparatively large volume of the compressed air brought to the main pressure by the pressure generating device 9 is stored intermediately, since the pressure generating device 9 typically operates discontinuously. In the main pressure line 15 there is arranged a pressure regulating means 11, for example a 2/2-way valve or a proportional valve. By way of the pressure regulating means 11, a connection is formed as necessary between the main pressure line 15 and a control pressure line 16 that extends between the pressure regulating means 11 and a pilot valve 12. The pilot valve 12 can be for example a 3/2-way valve. By way of the pilot valve 12, a connection between the control pressure line 16 and a pressure medium line is formed or interrupted, the pressure medium line 17 extending between the pilot valve 12 and the pressure chamber 7 of the pneumatic actuator 1.

Furthermore, a return-flow line 18 is also connected to the pilot valve 12, which extends between the pilot valve 12 and a pneumatic sink 14. The pneumatic sink 14 consists of the surroundings.

The pressure generating device 9, the pressure regulating means 11 and the pilot valve 12 are controlled by a control unit 13, these components being coupled to the control unit by respective signal lines 19, 20 and 21. By way of the control unit 13 control signals are sent to the pressure regulating means 11, the pilot valve 12 and the pressure generating device 9 in order to adjust the pressure in the pressure chamber 7 and thereby to displace the piston 3 of the pneumatic actuator 1 for the actuation of the pneumatically actuated device.

In the context of the present invention, to reduce or even eliminate dead times in the control of the pneumatic actuator 1 by the control unit 13, a pilot control component is determined as a function of at least a sliding friction force and/or at least a static friction force of the pneumatic actuator 1, namely in the example embodiment shown the piston 3 of the pneumatic actuator 1.

The invention is based on the recognition that for controlling the actuator 1, particularly when the piston 3 is moved, friction forces have to be overcome before the piston 3 actually begins moving. The pilot control component, which according to the invention is produced by the control unit 13 as a function of at least a sliding friction force and/or at least a static friction force of the pneumatic actuator 1, takes the friction forces to be overcome into account and accordingly reduces dead times in the control of the pneumatic actuator 1 and in the actuation of a device to be actuated pneumatically by the pneumatic actuator.

Figure 2:
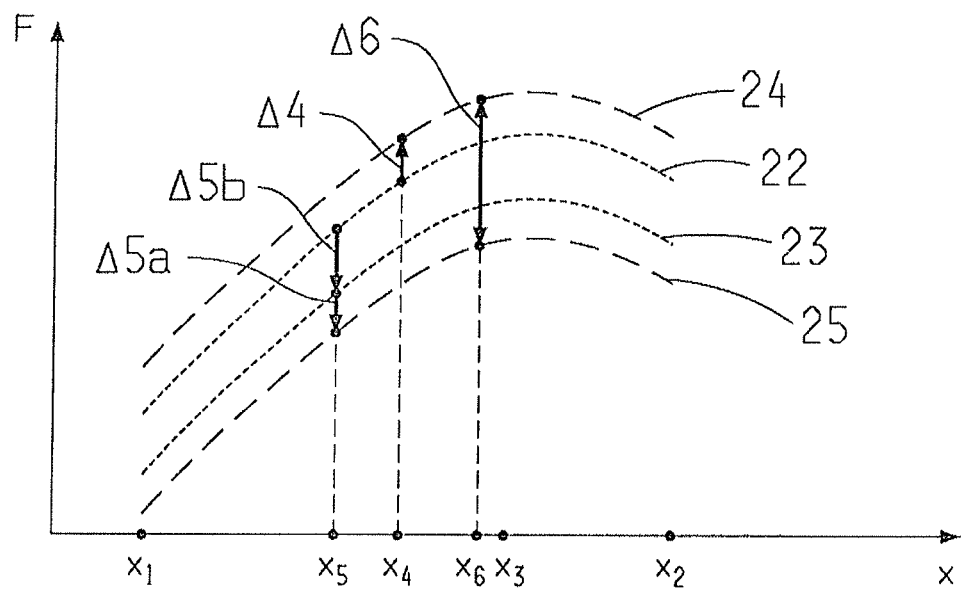
FIG. 2: A diagram to illustrate the method according to the invention.

FIG. 2 shows a plot, as a function of the position x of the actuator 1, namely in the example embodiment of FIG. 1 as a function of the position x of the piston 3, of the force F applied on the piston 3 during the actuation of a pneumatically actuated starting clutch, such that in position x1 of the piston 3, the starting clutch to be actuated is fully closed, in position x2 of the piston 3, the starting clutch to be actuated is fully open, and in position x3 of the piston 3 the starting clutch to be actuated is at its so-termed touch point, at which the clutch is just not transmitting any torque and is therefore still acting as a separator clutch.

In FIG. 2, as a function of the position x of the actuator 1, namely as a function of the position x of the piston 3, the variations of position-dependent sliding friction forces 22, 23 and static friction forces 24, 25 are plotted for both movement directions of the piston 3, the sliding friction force 22 and the static friction force 24 being associated with a first movement direction of the piston 3, for example a movement direction of the piston 3 from left to right, whereas the sliding friction 23 and the static friction 25 are associated with a second, opposite movement direction of the piston 3, for example a movement of the piston 3 from right to left.

If the piston 3 and hence the pneumatic actuator 1 is at rest, then depending on the previous movement direction it comes to rest on one of the sliding friction force curves 22 or 23. Thus, if the previous movement direction was a piston movement from left to right the piston 3 comes to rest on the sliding friction curve 22, whereas after the converse movement direction from right to left, in contrast the piston 3 comes to rest on the sliding friction curve 23.

If the piston 3 of the pneumatic actuator 1 is now set into motion from rest in the same defined movement direction as previously, then the pilot control component is chosen by the control unit 13 such that it is able, just or exclusively or exactly to overcome the difference between the sliding friction force acting in the defined movement direction and the static friction force acting in the defined movement direction.

In FIG. 2 this is shown as an example for a piston 3 at rest in a position x4, whose previous movement direction corresponded to a movement from left to right so that when it stops it has to come to rest at the position x4 on the sliding friction force curve 22. If, starting from the position x4, the piston is set into motion in the same movement direction as previously, then the pilot control component is a difference in force which corresponds to the variation or difference $\Delta 4$ in force between (a) and (b), where (a) is the sliding friction force in the defined movement direction acting at position x4 and (b) is the static friction force in the defined movement direction acting at position x4.

But if the piston 3 of the pneumatic actuator 1 is to be moved from rest in a defined movement direction which is the reverse of its previous movement direction, then the pilot control component is chosen by the control unit 13 such that it is able, just or exclusively or exactly to overcome the difference between the sliding friction force acting in the defined movement direction and the static friction force acting in the defined movement direction and the difference between the sliding friction force acting in the defined movement direction and the sliding friction force acting in the direction opposite to the defined movement direction.

In FIG. 2 this is shown as an example for a piston at rest at a position x5, whose previous movement direction was from left to right and which has thus come to rest in position x5 on the sliding friction force curve 22, but which thereafter is to be moved from rest with a reversal of its movement direction, i.e. from right to left. In this case the pilot control component then corresponds to the sum of the variation or difference Δ5a between the sliding friction force acting in the defined movement direction at position x5 and the static friction force acting the in the defined movement direction at position x5, and the variation or difference Δ5b between the sliding friction force acting a position x5 in the defined movement direction and the sliding friction force acting at position x5 in the direction opposite to the defined movement direction.

When the piston 3 of the pneumatic actuator 1 is at rest and its next movement direction is unknown, the control unit 13 chooses a pilot control component corresponding to half of the variation or half of the difference between the static friction forces acting in the two opposite movement directions.

In FIG. 2 this is shown as an example for a piston 3 at rest in a position x6, whose previous movement direction was from right to left and which therefore came to rest on the sliding friction force curve 23. In this case the next movement direction is not known, so the pilot control component corresponds to half the variation or half the difference Δ6 between the static friction forces acting at position x6 in the two different and opposite movement directions.

To determine the pilot control component, it is necessary to know the position-dependent sliding friction forces 22, 23 and static friction forces 24, 25 that act in the different movement directions. According to an advantageous further development of the invention, provision is made for adjusting the sliding friction forces 22, 23 and the static friction force 24, 25 adaptively during operation. In another advantageous further development of the invention, provision can be made, during operation to adjust adaptively either exclusively the sliding friction forces 22, 23 or exclusively the static friction forces 24, 25 and depending on this, determining, namely calculating the non-adaptively adjusted static friction force and sliding friction force as a function of a defined relationship between the sliding friction and the static friction. Thus provision can be made to use a proportional relationship between the static friction and the sliding friction by means of a proportionality factor, in order thus to calculate the static friction as a function of an adaptively adjusted sliding friction or the sliding friction as a function of an adaptively adjusted static friction.

Figure 3:
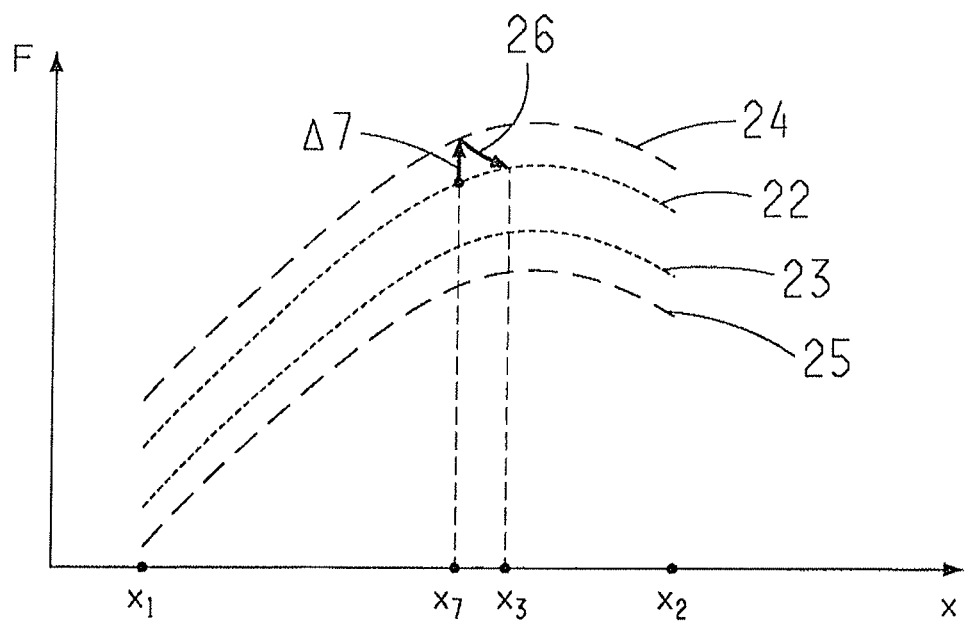
FIG. 3: A diagram to illustrate the method according to the invention.

When the piston 3 is at rest in a position x7, FIG. 3 illustrates the movement of the piston 3 when a pilot control component is applied to it which corresponds to the difference Δ7 between the sliding friction and static friction existing at position x7. If this pilot control component is used for controlling the pilot valve 12 and accordingly for influencing the pressure in the pressure chamber 7, then the position x of the piston shifts along the hyperbolic movement curve 26 so that the piston 3 comes to rest at the position x3 in the variant shown in FIG. 3. If, starting from its original position x7, a smaller position shift is required for the piston 3 than that given by the pilot control component Δ7 and the hyperbolic movement curve 26, then the pilot valve 12 must be actuated in such manner that despite the pressure increase in the pressure chamber 7 for moving the piston 3 from left to right, compressed air is released out of the pressure chamber 7 and discharged into the surroundings 14 in order to ensure a smaller position shift for the piston 3.

INDEXES

1 Actuator
2 Pressure regulation device
3 Piston
4 Pneumatic cylinder
5 Piston rod
6 Seal
7 Pressure chamber
8 Path measurement system
9 Pressure generating device
10 Compressed air reservoir
11 Pressure regulating means
12 Pilot valve
13 Control unit
14 Pneumatic sink
15 Main pressure line
16 Control pressure line
17 Pressure medium line
18 Return-flow line
19 Signal line
20 Signal line
21 Signal line
22 Sliding friction force curve
23 Sliding friction force curve
24 Static friction force curve
25 Static friction force curve

The invention claimed is:

1. A method of controlling a pneumatic actuator for actuation of a pneumatically actuated device, the actuator comprising a piston and a pneumatic cylinder, the piston being arranged to move axially in the pneumatic cylinder, the piston moving as a function of a pressure in a pressure chamber of the pneumatic cylinder, the method comprising the steps of:
  determining, via a path sensor, a present position and movement of the piston within the pneumatic cylinder to a desired position;
  determining at least one pilot control component comprising an amount of force required to move the piston within the pneumatic cylinder from the present position to the desired position, with the at least one pilot control component being determined as a function of at least one of a first sliding friction force and a first static friction force of the piston moving within the pneumatic actuator cylinder from the present position to the desired position; and
  adjusting the pressure in the pressure chamber, as a function of the at least one pilot control component, via a control unit which controls at least one of a valve, a pressure regulating means, and a pressure generating device;
  wherein at least one of the first sliding friction force and the first static friction force are position dependent forces that need to be overcome by the pressure in the pressure chamber for moving the piston in the pneumatic cylinder, and the first sliding friction force and the first static friction force are dependent on a movement direction of the piston and the present position of the piston within the pneumatic cylinder.

2. The method according to claim 1, further comprising selecting the at least one pilot control component based on a difference between the first sliding friction force and the first static friction force such that, if the piston is to be moved from rest in a defined movement direction which is the same as a previous movement direction of the piston, the piston is able to overcome a difference between the first sliding friction force acting in the defined movement direction and the first static friction force acting in the defined movement direction.

3. The method according to claim 1, further comprising selecting the at least one pilot control component based on the first sliding friction force, a second sliding friction force in a direction opposite to the first sliding friction force, and the first static friction force such that, if the piston is to be moved from rest in a defined movement direction which is opposite to a previous movement direction of the piston, the piston is able to overcome a difference between the first sliding friction force acting in the defined movement direction and the first static friction force acting in the defined movement direction, and a difference between the first and the second sliding friction forces acting in the defined movement direction and in a direction opposite to the defined movement direction.

4. The method according to claim 1, further comprising selecting the at least one pilot control component such that, if the piston is at rest and a subsequent movement direction of the piston is unknown, the at least one pilot control component corresponds to one half of a difference between the first static friction force and a second static friction force acting in direction opposite to the first static friction force.

* * * * *